United States Patent [19]

Bunn

[11] 3,993,192
[45] Nov. 23, 1976

[54] PIPELINE WEIGHT CONTAINER AND METHOD

[76] Inventor: Christopher Brian Bunn, 503-120 E. Keith Road, North Vancouver, British Columbia, Canada

[22] Filed: Nov. 10, 1975

[21] Appl. No.: 630,495

[52] U.S. Cl. .............................. 206/515; 220/23.8; 138/178; 61/105
[51] Int. Cl.² .................. B65D 21/00; B65D 21/02; F16L 9/00; F16L 1/00
[58] Field of Search ........... 206/515, 518, 519, 520; 220/23.6, 23.8, 22; 138/105, 106, 178; 285/45; 16/1; 61/72.1, 72.3, 72.4

[56] References Cited
UNITED STATES PATENTS

| | | | |
|---|---|---|---|
| 2,007,969 | 7/1935 | Grodsky | 61/72.1 |
| 2,896,809 | 7/1959 | Metzger et al. | 220/23.6 X |
| 3,240,512 | 3/1966 | Pennington et al. | 138/178 X |
| 3,673,987 | 7/1972 | Fletcher | 220/23.6 X |

Primary Examiner—William Price
Assistant Examiner—Steven M. Pollard
Attorney, Agent, or Firm—Larson, Taylor and Hinds

[57] ABSTRACT

A pipeline weight container comprising a self-supporting container having a hollow body with an open top. Hollow legs extending from the body, away from the open top. The legs are spaced and shaped (a) to be locatable and a close fit over a pipeline of predetermined diameter and (b) to be stackable with two other similar units, one inside the container and the other outside. There is also disclosed a method of locating a pipeline in a predetermined position comprising positioning over the pipeline a plurality of units at intervals. Each unit comprises a pipeline weight as described above. The container is filled with sufficient weight of a material to locate the pipeline.

11 Claims, 2 Drawing Figures

U.S. Patent     Nov. 23, 1976     3,993,192
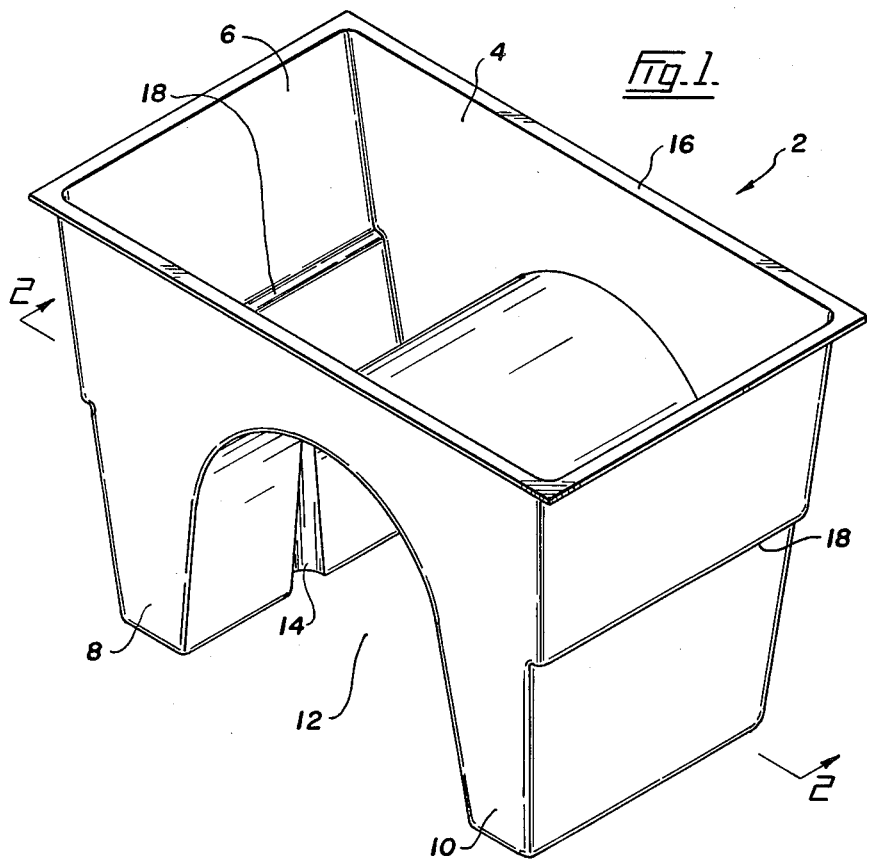
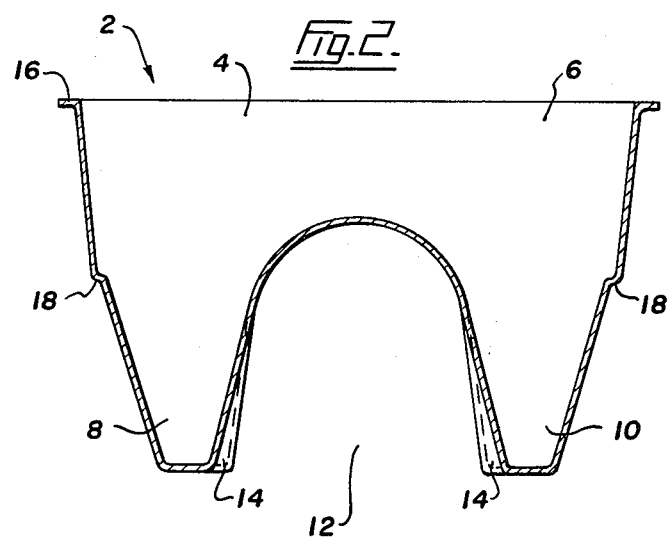

PIPELINE WEIGHT CONTAINER AND METHOD

FIELD OF THE INVENTION

The present invention relates to containers useful as pipeline weights and to a method of locating a pipeline using these weights.

DESCRIPTION OF THE PRIOR ART

In the laying of pipeline, particularly for gas or for oil, it is common to locate the pipeline in its predetermined position by the placing of extremely heavy weights over the pipeline. Typically, such a weight would be 20,000 pounds. Typically the pipeline is placed in the required position and then pipeline weights are placed over the pipeline, the number being determined by the location. For example, if the pipeline is passing through water then the weights will be used at greater frequency than if the pipeline is crossing over dry, firm land. Typically, these weights are simply large concrete blocks with an arched section removed so that they can be located over the pipeline and stand on the ground.

The transporting of such weights represents a considerable problem. For example, at present in Alaska it is necessary to load a truck with the weights and then to transport the weights on the truck to the required location. In view of the tremendous weights of each pipeline weight generally speaking the largest truck can only accommodate two weights. Particularly in Alaska, where labour and transport costs are extremely high, this is undesirable.

SUMMARY OF THE INVENTION

The present invention seeks to avoid the above disadvantages by providing a pipeline weight container easy to transport and simple to produce.

Accordingly, in one aspect, the present invention is a pipeline weight container comprising a self-supporting container having a hollow body with an open top; hollow legs extending from the body, away from the open top, and spaced and shaped (a) to be locatable and a close fit over a pipeline of predetermined diameter and (b) to be stackable with two other similar units, one inside the container and the other outside.

In a preferred embodiment the container is of a reinforced synthetic resin, preferably a glass reinforced polyester or epoxy resin.

The container is dimensioned so that it can receive the correct weight of material to hold the pipe in position. The correct weight may, for example, be of the order of 20,000 pounds.

In a further aspect, the present invention is a method of locating a pipeline in a predetermined position comprising positioning over the pipeline a plurality of units at intervals, each unit comprising a self-supporting container having a hollow body with an open top; hollow legs extending from the body, away from the open top, and spaced and shaped (a) to be locatable and a close fit over a pipeline and (b) to be stackable with two other similar units, one inside the container and the other outside; and filling the container with sufficient weight of a material to locate the pipeline.

BRIEF DESCRIPTION OF THE DRAWINGS

The invention is illustrated in the accompanying drawings in which:

FIG. 1 is a perspective view of a pipeline weight container according to the present invention; and FIG. 2 is a section through the line 2—2 of FIG. 1.

DESCRIPTION OF THE PREFERRED EMBODIMENTS

FIG. 1 illustrates a pipeline weight container generally indicated as 2. The container is made up of a hollow body 4 having an open top 6. The container has hollow legs 8 and 10 extending from the body 4 in the general direction away from the open top 6. The hollow legs 8 and 10 define an archway 12 that enables the container 2 to be locatable and a close fit over a pipeline of predetermined diameter. In order to make the unit nestable all edges and side slope inwardly, typically about 8° from the open top 6 to the bottom of the container, all the corners of the container 2 are rounded with a radius of 1½ to 3 inches, preferably about 2½ inches, the open top 6 is provided with a peripheral flange 16. The exterior of the limbs 8 and 10 are provided with inserts 14 of generally conical shape to provide strength and each end of the container 2 is also provided with a rib 18 to provide reinforcement.

The illustrated container 2 may be of any material strong enough to support contents of the required weight. Generally speaking, it is desirable that the container be made of reinforced synthetic resin, for example polyester or epoxy resin, reinforced with glass fibres.

A typical unit has the approximate dimensions of about 8½ feet wide, about 5½ feet high and about 5¼ feet thick. Wall thickness may be about ¼ inch. Flange 16 is 2 inches wide. Such a container is able to hold about 20,000 pounds of fill material and, when filled, constitutes an extremely successful means of locating a pipeline. Further, in view of its light weight, about 300 pounds, and because it is nestable, a considerable number of these units may be transported on one truck.

In use the container 2 is placed over a pipeline in a predetermined position. The legs 8 and 10 rest on the ground. The interior of the container 2 is then filled with any appropriate material able to impart the necessary weight. The following material would be suitable: concrete which, due to the support of the container could be of extremely low strength, formed using ungraded aggregates and reduced cement contents thus resulting in considerable cost savings; dense sand; Pit Run aggregates and sub or surface soils. The container 2 may be filled once in position or it may be filled and then put in position. However as, for example, the container described above weighs about 300 pounds it will be appreciated that, when empty, it can even be manhandled into position should that be necessary. Thus, an advantage of the invention is the absence of heavy lifting equipment so that the container is desirably placed in position empty and then filled. A further advantage is greatly reduced costs in both production and transport.

As a demonstration of the strength of the units one container was filled with 20,000 pounds of material and jacked 1 inch clear from its bearing pad. The jacking points were 4 inches wide and were located at approximately 1 foot centered around the circumference of the archway 12. The container 2 was able to withstand the load without great deflection. It must be emphasized that this is an extremely strenuous test and far exceeds the demands that will be made upon the container in use where the pipeline running through the archway 12 would, of course, at least provide support for the interior of the archway 12.

I claim:
1. A pipeline weight container comprising a self-supporting container comprising:
a hollow body having an open top;
hollow legs extending from the body, away from the open top, and spaced and shaped (a) to be locatable and a close fit over a pipeline of predetermined diameter and (b) to be stackable with two other similar units, one inside the container and the other outside.
2. A pipeline weight container as claimed in claim 1, made of a reinforced synthetic resin.
3. A pipeline weight container as claimed in claim 2, in which the reinforcement is glass fibre.
4. A pipeline weight container as claimed in claim 1, dimensioned to receive the required weight of material to locate the pipeline.
5. A pipeline weight container as claimed in claim 1, including a peripheral flange around the open top.
6. A pipeline weight container as claimed in claim 1, in which all edges slope inwardly about 8° from top to bottom.
7. A pipeline weight container as claimed in claim 1 formed with inserts on the sides of the limbs to reinforce the limbs.
8. A pipeine weight container as claimed in claim 1, including reinforcing ribs on each end of surface.
9. A pipeline weight container as claimed in claim 1, in which all corners are of about a 2½ inch radius to facilitate nesting.
10. A method of locating a pipeline in a predetermined position comprising positioning over the pipeline a plurality of units at intervals, each unit comprising a self-supporting container comprising a hollow body having an open top;
hollow legs extending from the body, away from the open top, and spaced and shaped (a) to be locatable and a close fit over a pipeline and (b) to be stackable with two other similar units, one inside the container and the other outside;
and filling the container with sufficient weight of a material to locate the pipeline.
11. A method as claimed in claim 1 in which the unit is a synthetic resin reinforced with glass fibre.

* * * * *